UNITED STATES PATENT OFFICE.

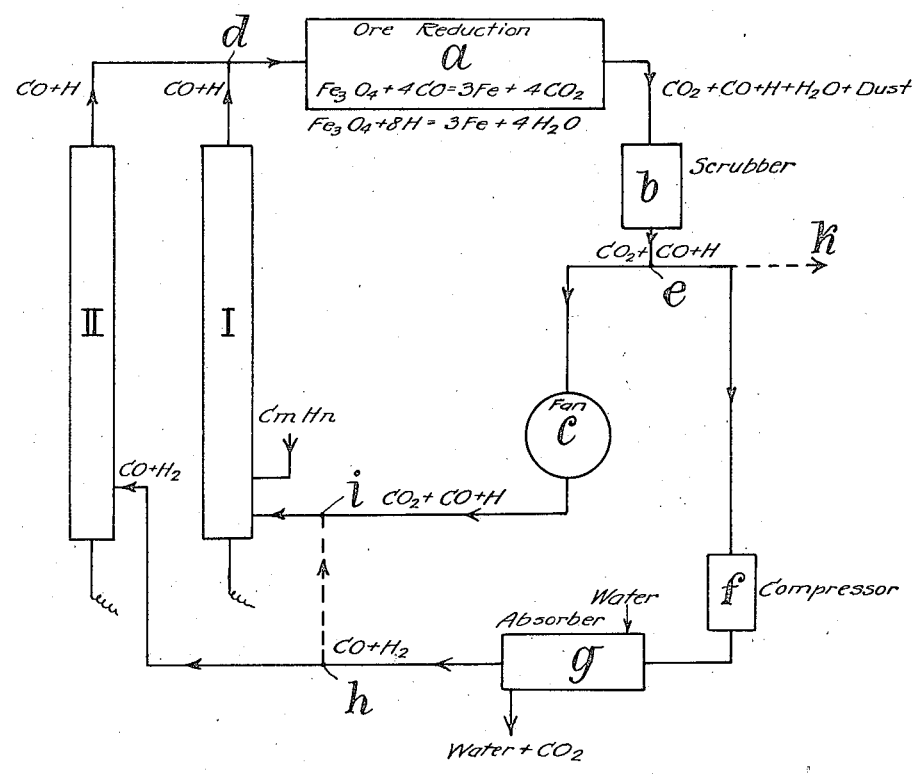

SIGURD WESTBERG AND EMIL EDWIN, OF CHRISTIANIA, NORWAY.

REDUCTION OF ORES.

1,256,623.

Specification of Letters Patent. Patented Feb. 19, 1918.

Application filed August 26, 1916. Serial No. 117,064.

*To all whom it may concern:*

Be it known that we, SIGURD WESTBERG, a subject of the King of Norway, residing at Bygdö Allé 3, Christiania, Norway, and EMIL EDWIN, a subject of the King of Norway, residing at Cort Adlers gate 12, Christiania, Norway, have invented certain new and useful Improvements in the Reduction of Ores; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the reduction of oxid ores by means of reducing gases and has for its object improvements in the preparation of a reducing gas especially suitable for this purpose and the reduction of ores thereby.

In the reduction of oxid ores more especially iron ores it has been endeavored for a long time to provide a pure gas reduction process. The reason for this lies in the advantages connected with such pure gas reduction and which principally consists in the following:

1. The production of a practically chemically pure product, which by means of a simple carburation process may be converted into a high-grade steel.

2. The reduction process may be carried out at a comparatively low temperature whereby a reduction of the metallic oxids which are more difficult to reduce is avoided and at the same time a less expensive and more durable apparatus can be used.

3. It is possible to establish a quite homogeneous or uniform process, and to obtain quite constant reaction conditions.

In spite of these important advantages the problem has not as yet been practically solved, this is due to various great difficulties connected with the realization of the process. More especially these difficulties are as follows:

1. The cost of the gas produced for the purpose of the reduction.

2. The necessity of enormous quantities of gas for the production of a comparatively small quantity of the product and in connection herewith an unsatisfactory utilization of the reduction material.

3. The difficulty of maintaining the necessary temperature in the reduction compartment.

The present invention now has for its object a process by means of which these difficulties are avoided while at the same time a quantitative and ideal utilization of the reduction material is obtained in that the reduction material during the process is completely converted into carbon dioxid and water. Besides this the other known advantages connected with the use of a pure gas reduction are obtained. This result is obtained by the use of a gas production method which not only allows of manufacturing the gas at a low cost and on a large scale but which at the same time gives a gas of such a composition that only a minimum of heat supply is necessary to maintain the necessary temperature in the reduction compartment. A feature of importance in obtaining this result also consists in that the heat in sufficient quantity is supplied through the gas itself. In connection with this method of reduction a characteristic circulation is employed by means of which it is made possible to use a quantity of gas or reduction material respectively, which does not amount to more than one fourth or one fifth of the quantity required in other known gas reduction processes.

In the preferred embodiment of the invention the process comprises two quite different steps which are in themselves novel and characteristic. The principal object of the invention was to provide a process by means of which it was possible to obtain on a large scale and at a low cost a gas especially rich in carbon monoxid, and at the same time that the heat content of the gas after its having left the reaction compartment was sufficient to bring about the subsequent reduction. The desire of obtaining a gas which is as rich in carbon monoxid as possible coincides with the difficulty of maintaining the necessary temperature in the reduction compartment. The carbon monoxid as is known effects the reduction of iron ores without heat being evolved to such an extent as to be measurable while the hydrogen reduction is a comparatively strong endothermic process. According to the present invention the result aimed at is obtained by the use of the electric high tension flame, the liquid combustibles rich in carbon, especially raw petroleum or heavy distillates of the latter being burned in this flame in an atmosphere consisting of or containing carbon dioxid. Instead of petroleum other liquid or semiliquid products such as wood tar, various alcohols and the like may be used. Pulverized pure carbon or carbonaceous materials may also be employed for this purpose. The carbon dioxid or the gas containing this substance together with the gasified or pulverized and finely distributed liquid or solid combustible is caused to pass through or around the electrical flame, the stabilization and manner of action being about the same as according to the well known methods of electrical air combustion. The burning of the combustibles to carbon monoxid does not take place in the same manner as usual in combustion processes under evolution of heat but under a strong consumption of energy and according to the present invention this energy is substituted in the most ideal manner by the free electrical energy, which is constantly transformed in the electrical flame.

Chemically the reaction may be expressed as follows:

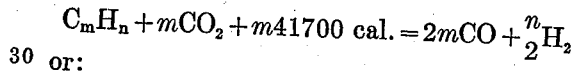

or:

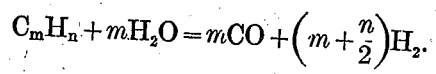

In view of the fact that for instance a raw petroleum contains only about 13% H while the rest is C it will be easily understood that the gas produced principally will consist of carbon monoxid. By the use of raw petroleum a proximately ideal gas is obtained the small quantities of hydrogen promoting the last reduction of FeO. If pulverized pure carbon were employed it would be possible in this manner to produce a practically chemically pure carbon monoxid gas. If in some cases a gas more rich in hydrogen were desired this may be obtained by introducing together with the carbon dioxid more or less water vapor whereby a similar reaction will take place between the water vapor and the combustible as above described as taking place between the carbon monoxid and the combustible, save that in this latter case a gas mixture containing a much greater content of hydrogen is obtained, a result which is not however the principal object of the present invention, according to which it is purposed to work at temperatures below 1000–1100° C.

It is to be emphasized, however, that in poor ores it may be of importance to raise the temperature to 1200–1300° C. This would involve the necessity of approaching the greatest possible content of hydrogen in the gas while at such temperatures the equilibrium as regards the CO is very unfavorable. In this latter instance the carbon dioxid in the above explanation must be substituted to the greatest possible extent by water vapor the necessary reaction heat being then as far as possible supplied through the ore itself.

If at the same time that the reaction above described takes place smoothly and quantitatively, the gas will also leave the reaction compartment with a temperature of up to 1300° C. and as it is practically free from impurities, it may be supplied directly to the reduction compartment. The heat stored in the gas is utilized to maintain the necessary temperature; as the gas principally contains CO and only small quantities of $H_2$ this result may be obtained with such small quantities of gas that the reducing power of the latter may be utilized up to a carbon dioxide content of 30–40%. To obtain a most economical gas reduction the described gas production method is suitably as above described used in connection with a circulation of the gas, arranged in a special manner. This circulation allows of an ideal and completely quantitative utilization of the reduction material, so that it becomes possible to produce the iron with a practical consumption of combustibles amounting to only 140 liters raw petroleum for each ton of Fe or if coal dust is used a consumption of about 150 kg. for each ton of Fe. An example of how the gas circulation is effected is described below with reference to the accompanying diagrammatic drawing.

The combustible is supplied to the flame furnace in a finely pulverized or in a gasified state either alone or together with a certain part of the carbon dioxid-containing gas leaving the reduction compartment $a$. This latter gas after having left the reduction chamber first pass through a scrubber $b$, in which dust and water vapor is separated and then through a fan $c$, by means of which the necessary pressure is imparted to the gas to cause it to pass through the flame furnace. After having passed the flame furnace I in which the reaction above described takes place the gas principally consists of CO and $H_2$ at the same time it has a temperature of 1000–1100° C.

At this temperature the gas is passed over $d$ directly into the reduction compartment $(a)$. In the reduction chamber a part of the carbon monoxid and of the hydrogen is converted into carbon dioxid and water. The water is separated off together with the dust coming from the reduction chamber, in the scrubber, which may be of a generally known type while the gas consisting of CO, $H_2$ and $CO_2$ is passed to the connection point $e$. At the point $e$ the gas which should be passed to the flame furnace I is branched off, while the other part of the gas leaving the scrubber is supplied to a special water absorption system $f$, $g$, working under pressure where the carbonic acid in sufficient quantity is separated out, whereupon the remaining CO, $H_2$-mixture after having passed through the flame furnace II where it is heated to 1000–1100° C. is supplied in a heated state to the circulation system at the connection point $d$ or it may be passed over $h$—$i$ into the gas coming from the fan together with which it is passed through the flame furnace I. In the latter instance the flame furnace II becomes useless. In certain cases in which the combustible is obtained at a very low cost it may prove economical to omit the absorption system, the carbon dioxid or the oxygen respectively being then removed by withdrawing from the circulation system over $k$ a certain proportion of the gas leaving the scrubber $b$. By a close study of the described circulation it has been found that the maintenance of constant conditions in the system is connected with certain difficulties, because the fan as well as the compressor and the supply of combustible had to be put under a very extensive and sensitive control. We have found that these difficulties may be avoided simply by dividing the gas current leaving the scrubber in two portions of about equal quantities of which one is passed to the flame furnace I, while the other portion pass to the absorption system. By this means the gas passing to the reduction chamber contains practically no carbonic acid and at the same time the fan, as well as the compressor becomes practically independent of the content of carbon dioxid in the gas leaving the reduction chamber, the whole system being made self-controlled in such a manner that only the necessary quantity of combustible has to be proportionated. This latter operation may be effected automatically by means of two balanced gasholders inserted at suitable points and which at the same time serve to maintain an exactly constant pressure in the system.

We claim:

1. The process, which comprises subjecting a carbonaceous combustible material to the action of an electric high tension flame in an atmosphere containing oxygen in a combined state to form a reducing gas and reacting upon an oxid ore with such gas.

2. The process, which comprises subjecting a carbonaceous combustible material to the action of an electric high tension flame in an atmosphere containing carbon dioxid to produce a reducing gas and reacting upon an oxid ore with the resulting hot gas.

3. The process, which comprises subjecting a carbonaceous combustible material to the action of an electric high tension flame in an atmosphere containing oxygen in a combined state to form a reducing gas, and reacting upon an oxid ore with said gas, the quantities of combustible and of the oxygenous atmosphere which is supplied to the arc flame being proportioned relatively to each other and to the heating energy of the arc flame, the carbon compounds present being converted into carbon monoxid at the same time the gas is supplied with heat energy to subsequently exert its reducing action upon the ore.

4. The process, which comprises subjecting a carbonaceous combustible material to the action of an electric high tension flame in an atmosphere containing carbon dioxid and water vapor to produce a reducing gas, and reacting upon an oxid ore with said gas.

5. The process, which comprises subjecting a carbonaceous combustible material to the action of an electric high tension flame in an atmosphere containing oxygen in a combined state, and reacting upon an oxid ore with gas obtained by this treatment, a quantity of the gas resulting from this reaction being returned through the arc flame to the cycle of operations.

6. The process, which comprises subjecting a carbonaceous combustible material to the action of an electric high tension flame in an atmosphere containing oxygen in a combined state, and reacting upon an oxid ore with the resulting gas, a quantity of said gas being returned to the arc flame while another quantity of the gas is vented from the system, thereby removing a suitable quantity of oxygen in a combined state.

7. The process, which comprises subjecting a carbonaceous combustible material to the action of an electric high tension flame in an atmosphere containing oxygen in a combined state, reacting upon an oxid ore with the resulting gas, subjecting a quantity of the gas resulting from the reaction with the ore to a purification process and introducing the purified gas into the arc flame space, while another quantity of the gas resulting from the reaction with the ore is subjected to a carbon dioxid absorption process and then introduced into the arc flame space.

8. The process, which comprises subjecting a carbonaceous material and oxygen in combined gaseous state to an electric high tension arc to produce a gas consisting essentially of carbon monoxid and hydrogen heated sufficient for reduction, reducing an oxid ore therewith, eliminating the water due to the reduction, returning some of the resulting gas mixture to the arc for re-heating and the simultaneous conversion of carbon dioxid into carbon monoxid.

9. The process, which comprises subjecting carbonaceous material and a gas containing combined oxygen to a high tension electric arc, thereby producing a gas containing essentially carbon monoxid and hydrogen heated to reducing temperature, reducing an oxid ore with such gas, purifying the resulting gas, returning a portion of said gas to the arc and removing carbon dioxid from another portion of the gas and returning it to the arc, thereby stabilizing the action of the arc.

10. The process, which comprises treating a carbonaceous reducing substance in a gaseous or vaporized state in a high tension arc in the presence of carbon dioxid and directly treating a reducible ore with such gases while heated to reduction temperature.

In testimony that we claim the foregoing as our invention, we have signed our names in presence of two subscribing witnesses.

SIGURD WESTBERG.
EMIL EDWIN.

Witnesses:
C. VORMAN,
THOS. BERG.